Aug. 8, 1939.  J. CHRISTIE  2,168,974
DOUBLE EXPOSURE PREVENTION CAMERA
Filed Oct. 5, 1938  2 Sheets-Sheet 1
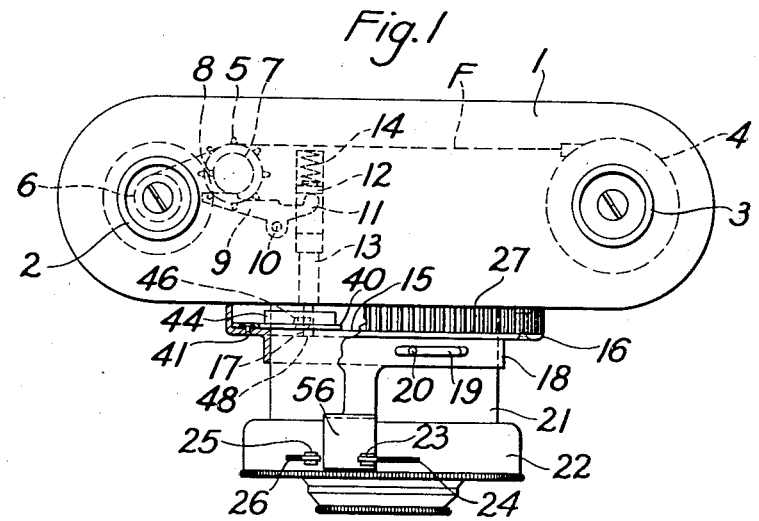
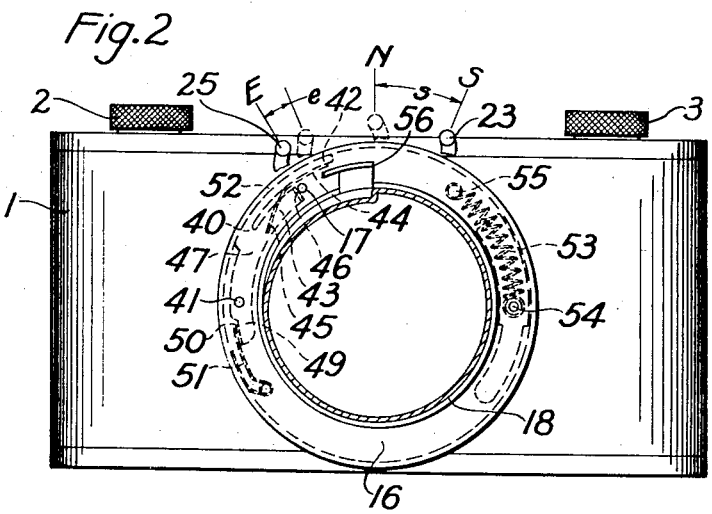
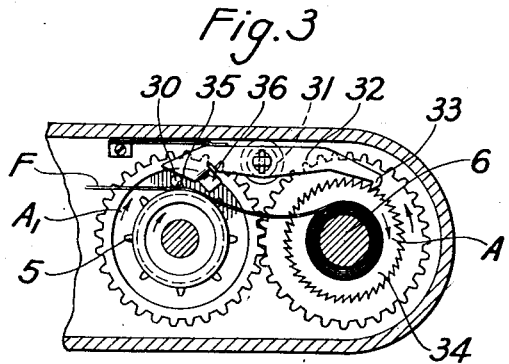
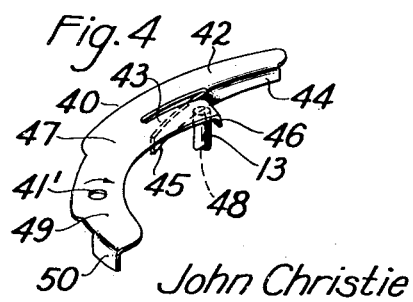
John Christie
INVENTOR
BY
ATTORNEYS Aug. 8, 1939.　　　J. CHRISTIE　　　2,168,974
DOUBLE EXPOSURE PREVENTION CAMERA
Filed Oct. 5, 1938　　　2 Sheets-Sheet 2

John Christie
INVENTOR

BY
ATTORNEYS

Patented Aug. 8, 1939

2,168,974

UNITED STATES PATENT OFFICE 2,168,974

DOUBLE EXPOSURE PREVENTION CAMERA

John Christie, Rochester, N. Y., assignor to Eastman Kodak Company, Rochester, N. Y., a corporation of New Jersey Application October 5, 1938, Serial No. 233,444

7 Claims. (Cl. 95—31)

This invention relates to photography and more particularly to photographic cameras.

One object of my invention is to provide a relatively simple double exposure prevention camera which is so arranged that the shutter can only be set and released in proper relation to the winding of the film. Another object of my invention is to provide a camera with a movable member for successively operating a shutter trigger and a shutter setting member and to provide means actuatable, through movement of the film, for locking and releasing the movable member. Another object of my invention is to provide a double exposure prevention device in which a single pivoted latch member and a plunger serve to interlock the shutter and film. Other objects will appear from the following specification, the novel features being pointed out in the claims at the end thereof.

Coming now to the drawings in which like reference characters denote like parts throughout:

Fig. 1 is a plan view of a typical camera constructed in accordance with and embodying a preferred form of my invention, certain parts of the camera mechanism being broken away and shown in section.

Fig. 2 is a front elevation of the camera shown in Fig. 1, the lens tube being shown in section and the shutter being removed to more clearly show the double exposure prevention device mechanism.

Fig. 3 is a fragmentary section showing an interlock between a film sprocket and a film winding mechanism together with a ratchet lock.

Fig. 4 is a perspective view of the hinged spring lock which controls the relationship of a plunger and an operating ring.

Figure 5:
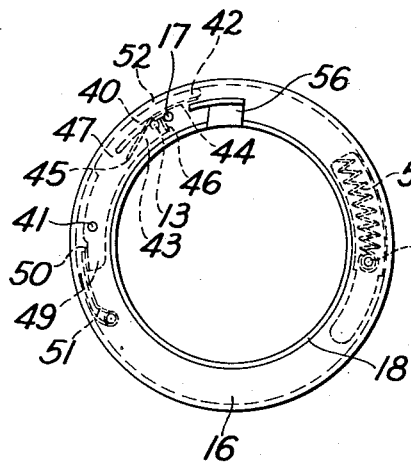
Fig. 5 is a fragmentary view showing a front elevation of the operating ring, latch and associated parts in the position for making an exposure.

A great many devices have been proposed for preventing or reducing double exposures, but most of these have required a large number of moving parts and are comparatively complicated and expensive to make. In accordance with my invention, I have endeavored to eliminate as many moving parts as possible and to make a structure which is simple and comparatively rugged so that it may be inexpensively made and so that it will be durable in use.

As a preferred embodiment of my invention, I have shown my double exposure prevention mechanism as being mounted on a camera here shown as a "miniature" camera, preferably using perforated motion picture film, although, of course, the structure which will be hereinafter more fully described can be used in connection with any camera employing perforated film or any camera in which a measuring wheel is operated by the film as it is wound on a take-up spool.

As indicated in the drawings, the camera body 1 may be provided with a film winding knob 2 and a film rewinding knob 3, a film F being adapted to be drawn from a film retort 4 across the exposure plane over a sprocket wheel 5 from which it is drawn upon a take-up spool 6. With cameras of this type, it is customary to wind the film onto a take-up spool until the end of the film is reached, the end of the film being definitely attached to a hub in a retort so that the film may be rewound into the retort for removal from the camera after all the exposures have been made.

The film sprocket 5 is of such diameter that it makes one revolution each time and a fresh area of film is wound into position. This sprocket includes a hub member 7 with an offset lug 8, this lug being adapted to rock the lever 9 upon its pivot 10 each time the sprocket is rotated. Lever 9 includes an end 11 pressing against a flange 12 of a plunger 13, this plunger being pressed by a spring 14 into a position in which the end of the plunger may engage either an inner surface 15 of a ring 16 or may pass through the locking aperture 17 of the ring.

The ring 16 may include a flange 18 and a slot 19 through which a pin 20 passes to control the total movement of the ring in two directions upon its support, which is a cylindrical member 21 attached to the camera body 1 at one end and supporting a camera shutter 22 of known type at the opposite end.

This shutter is of a setting variety and includes a setting lever 23 which must be moved through a slot 24 to tension the shutter spring and includes a trigger 25 which must be moved through a slot 26 for actuating the shutter. As shown in the diagram at Fig. 2, it should be noted that the setting lever 23 moves from its broken line position in Fig. 2 to its full line position in Fig. 2 to set the shutter. The trigger moves from its broken line position in Fig. 2 to its full line position in Fig. 2 to actuate or trip the shutter.

The ring 16 normally lies in its neutral position or in the position of rest indicated by the letter N in Fig. 2. In setting the shutter, this ring must be moved in a clockwise direction from the neutral position to the setting position indicated by S in Fig. 2. After the shutter has been set, the ring moves again to its neutral position, from which it must be moved in a counter-clockwise direction, a distance sufficient to trip the shutter as indicated at E in Fig. 2, it being understood that the angular movement for tripping the shutter needs only to be a distance equal to the distance e and the angular distance necessary to set the shutter being the distance shown as s in Fig. 2.

As above explained, when the shutter has just been actuated, the locking pin 13 engages an aperture 17 in the ring 16. Thus, if an operator, by grasping the knurling 27, should endeavor to set the shutter, he cannot do so. It is therefore necessary to wind the film. In order to wind the film, the structure shown in Fig. 3 is used, this structure not being original with me, but being shown in U. S. Patent No. 2,150,696, John B. Nelson, for Film winding mechanism, granted March 14, 1939 (U. S. application Serial No. 159,744, filed August 18, 1937). Reference may be had to this patent for a complete description of the film locking mechanism, but I will now describe as much as is necessary for the present application.

The winding spool 6, as above described, is attached to a film winding knob 2. This knob turns the spool in the direction shown by the arrow A in Fig. 3 to wind the film F thereon and as this movement takes place, the apertures in the film turn the film sprocket 5, causing the pin 30 to turn one revolution for each exposure. After an exposure has been made, a button 31 on the outside of the camera is depressed to move the latch member 32 axially until the pawl 33 releases the ratchet 34. This permits the winding knob 2 to move and the pin 30 to rotate until the pin, turning in the direction shown by the arrow A1, reaches the position shown in Fig. 3, in which position it will strike the end 35 of lever 32, causing the pawl 33 to enter the ratchet and stop the film winding movement.

In rewinding the film by means of the rewinding handle 3, the pin passes under an upturned end 36 of the lever so that it moves the latch axially without stopping the film winding and so that it is possible to wind the film back into the retort 4 without holding the push-button in a depressed position. For further details of this structure, reference may be had to the above-mentioned patent.

Coming again to my invention, Fig. 2 illustrates the relation of the parts after an exposure has been made and in which the operating ring 16 is latched against movement. As indicated in Fig. 4, the inside of the ring 16 carries a spring latch member 40 upon a stud 41 passing through an aperture 41' in the spring latch member. This spring latch member is provided with two arms 42 and 43. Arm 42 includes a downwardly turned flange 44 terminating in a spring arm member 45 projecting beneath arm 43. Arm 43 includes a downwardly turned arm 46 and arms 42 and 43 each include a relatively flat upper surface 47 against which the end 48 of the locking pin 13 is adapted to ride during certain positions.

Lever 40 likewise includes an arm 49 with a downwardly extending flange 50 arranged to be engaged by a spring 51 which, as shown in Fig. 2, tends to turn the lever about its pivot in the direction shown by the arrow. Thus, the spring 51 normally holds the spring latch member with the arm 42 resting against the flange 52 of the ring 16, as shown in Fig. 2.

The ring 16 is normally held in a neutral position by means of a spring 53 attached at one end to a stud 54 carried by the ring 16 and attached at the other end to a stud 55 carried by the camera body.

With the parts shown in the position of Fig. 1, the end of the plunger lies in the aperture 17 and the spring 53 has almost pulled the ring 16 to its neutral position, but there is still the opportunity for the spring to move the ring 16 a short distance. Consequently, when the spring plunger 13 is withdrawn from the aperture 17, the spring 53 immediately moves the ring a distance sufficient to cause the return of the plunger 13 to strike the underside of lever arm 43, since the downwardly turned end 46 has meanwhile passed across the aperture 17. Thus, the spring plunger 13 is held by the action of the spring 14 against the smooth under surface 47 of the spring lever 40.

Figure 6:
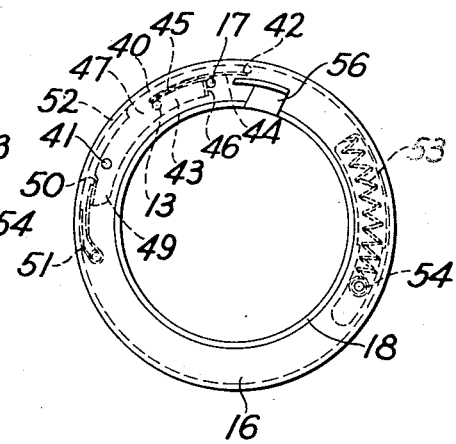
Fig. 6 is a view similar to Fig. 5, but with the ring moved toward a position to release the shutter and just before the trigger is released.
Figure 7:
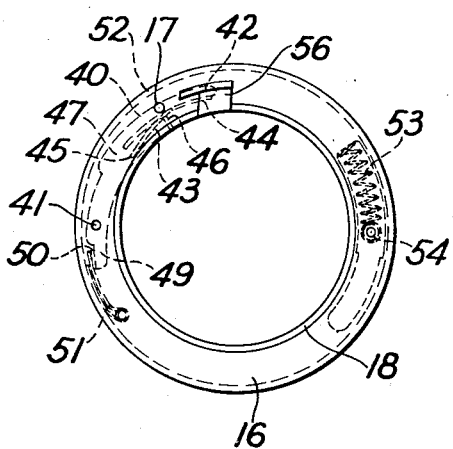
Fig. 7 is a view similar to Figs. 5 and 6, but with the parts in a position which they assume after an exposure has been made but before the ring moves to its neutral position.
Figure 8:
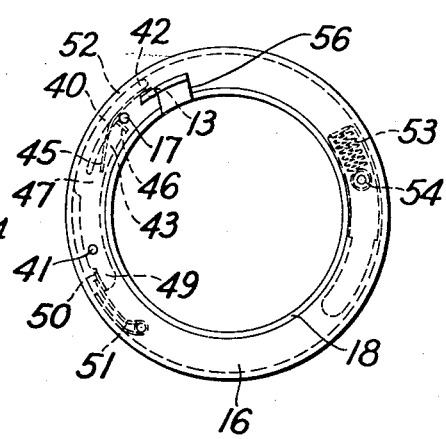
Fig. 8 is a view similar to Figs. 5 and 7 inclusive, but with the parts in their definitely locked neutral position in which the film must rest, but wound before the shutter may be again set.

It is now possible to move the shutter to set it in a clockwise direction. With the parts in the position shown in Fig. 5, the ring 16 is now rotated in a clockwise direction, causing the spring plunger 13 to compress the spring arm 45 until it snaps by this spring arm and the spring 53 may return the ring 16 to its neutral position. Fig. 6 shows the relative location of the spring plunger 13 and the spring arm 45 just prior to passing the end of this spring member. Thus, when the shutter has been set, the parts move to the position shown in Fig. 7. From this position, the ring 16 may be rotated in a counterclockwise direction to operate the trigger 25. This movement causes the spring plunger 13, still riding on the underside 47 of the spring latch 40, to ride up under the arm 42 and behind the flange 44 until just as an exposure is made, the end of the arm 42 releases the spring plunger 13 so that it will again engage the inner periphery of the ring 16. Consequently, when the ring 16 returns toward its normal position, the spring plunger 13 will immediately snap into the aperture 17 preventing the complete return of the ring 16 to its neutral position. Thus, it is necessary to again wind the film before the shutter can be set and it is, of course, necessary to set the shutter before the trigger can be operated.

I realize that with this construction it is possible for an operator to depress the push-button 31 and to wind more than one film area into place without first actuating the shutter. This action is extremely unlikely because the only way that the film can be registered is to allow the latch member 32 to stop the winding after one area has been positioned. Consequently, the proper operation of the camera requires only a momentary pressure on the release button 31, and if this occurs, there can be no error in winding the film.

The film is positively stopped after winding an area into place and the setting mechanism can only be released after the film has been wound and the shutter trigger can only be operated after the shutter has been set. Consequently, a camera constructed in accordance with the above description is substantially foolproof and is simple in construction, requiring very few moving parts.

I would like to point out that while in Fig. 2 the trigger 25 and the setting lever 23 are shown as projecting from the camera shutter, it is, as a matter of fact, desirable to cut off these levers so that they can only be conveniently operated by turning the ring 16. However, it is thought that the description can be made much plainer by illustrating these members as shown, and it is my intention either to cut off these levers so that they will be too short to be manually operated, except by the movement of the ring 16 through the arm 56 which projects between the two levers, or else I propose to cover up these levers with a shield so that an operator will be definitely prevented from operating them.

What I claim is:

1. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, an oscillatable member carrying means for engaging the shutter setting lever and trigger, walls carried by the oscillatable member adapted to be engaged and locked by said plunger, and a spring latch member positioned on the oscillatable member for holding said plunger from locking engagement with said plunger until after said trigger has been actuated by said oscillatable member.

2. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, an oscillatable member carrying means for engaging the shutter setting lever and trigger, walls carried by the oscillatable member adapted to be engaged and locked by said plunger, and a spring latch member pivotally mounted on the oscillatable member and including a flat surface against which the spring plunger may rest, said oscillatable lever being movable to release the shutter at one extreme of its movement, the position of the spring latch being such that when in said position the latch may be moved from the spring plunger permitting said plunger to reengage the aperture in said oscillatable member.

3. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, an oscillatable member carrying means for engaging the shutter setting lever and trigger, walls carried by the oscillatable member adapted to be engaged and locked by said plunger, when said oscillatable member is in a predetermined position, a spring tending to hold said oscillatable member in a normal position, a spring latch pivotally attached to the oscillatable member, a lug on said latch adapted to be held against the spring plunger by the spring whereby movement of the plunger through a film winding operation may permit said spring to move said oscillatable member and latch until the plunger, when released, may be pressed into engagement with the latch on the other side of said lug whereby only a setting movement of said oscillatable latch is permitted.

4. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, an oscillatable member carrying means for engaging the shutter setting lever and trigger, walls carried by the oscillatable member adapted to be engaged and locked by said plunger, when said oscillatable member is in a predetermined position, a spring tending to hold said oscillatable member in a normal position of rest spaced from its locked position, a spring latch pivotally attached to the oscillatable member, a lug on said latch adapted to be held against the spring plunger by the spring whereby movement of the plunger through a film winding operation may permit said spring to move said oscillatable member and latch until the plunger when released may be pressed into engagement with the latch on the other side of said lug whereby only a setting movement of said oscillatable latch is permitted, a spring arm on said latch adapted to be engaged by said spring plunger, movement of the oscillatable member to set the shutter causing said spring arm to snap over said plunger whereby said latch lug may be moved from a pin engaging position permitting said oscillatable member to move in a direction to trip the trigger.

5. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, a tubular camera extension adjacent the shutter, a ring oscillatably mounted on the tubular extension, a shutter trigger and a shutter setting lever spaced apart, means on the ring for actuating the trigger and setting lever, a spring for holding said ring in a normal position of rest, an aperture in the ring in position to be engaged by the spring plunger for locking the ring to one side of its normal position of rest, and means carried by the ring and movably mounted thereon for controlling the direction in which the ring may be moved when unlocked.

6. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, a tubular camera extension adjacent the shutter, a ring oscillatably mounted on the tubular extension, a shutter trigger and a shutter setting lever spaced apart, means on the ring for actuating the trigger and setting lever, a spring for holding said ring in a normal position of rest, an aperture in the ring in position to be engaged by the spring plunger for locking the ring to one side of its normal position of rest, and means carried by the ring, and movably mounted thereon and adapted to engage the spring plunger for cooperating with said plunger for controlling the direction the ring may be moved when unlocked.

7. In a roll holding camera, the combination with a camera body including means for passing film therethrough, a spring plunger, means operated by the film for retracting the plunger each time a fresh area of film is wound into place, a shutter carried by the camera, a setting lever therefor, a trigger for the shutter, a tubular camera extension adjacent the shutter, a ring oscillatably mounted on the tubular extension, a shutter trigger and a shutter setting lever spaced apart, means on the ring for actuating the trigger and setting lever, a spring for holding said ring in a normal position of rest, an aperture in the ring in position to be engaged by the spring plunger for locking the ring to one side of its normal position of rest, and means carried by the ring and movably mounted thereon and adapted to engage the spring plunger for cooperating with said plunger for controlling the direction the ring may be moved when unlocked, said means releasing said plunger when moved to actuate said trigger whereby the ring may move under the impulse of its spring into position to be locked by the spring plunger.

JOHN CHRISTIE.